United States Patent [19]

Mukaemachi et al.

[11] 4,075,431
[45] Feb. 21, 1978

[54] SPEECH PATH SYSTEM

[75] Inventors: Takuji Mukaemachi; Tetsuo Takeshita, both of Yokohama; Tatsuru Miyoshi, Fujisawa; Takafumi Kojima, Yokohama, all of Japan

[73] Assignee: Hitachi, Ltd., Japan

[21] Appl. No.: 661,660

[22] Filed: Feb. 26, 1976

[30] Foreign Application Priority Data

Feb. 28, 1975 Japan .................. 50-24015

[51] Int. Cl.$^2$ .................. H04M 7/06; H04Q 3/00
[52] U.S. Cl. .................. 179/18 GF; 340/166 R
[58] Field of Search .......... 179/18 GF, 18 F, 18 FA; 340/166 R

[56] References Cited

U.S. PATENT DOCUMENTS

| | | | |
|---|---|---|---|
| 3,410,961 | 11/1968 | Slana | 179/18 FA |
| 3,760,361 | 9/1973 | Leger et al. | 179/18 GF |
| 3,801,749 | 4/1974 | Jovic | 179/18 GF |
| 3,826,873 | 7/1974 | Susi | 179/18 GF |
| 3,838,223 | 9/1974 | Lee et al. | 179/18 FA |
| 3,865,979 | 2/1975 | Hestad | 179/18 GF |
| 3,942,040 | 3/1976 | Okuhara | 179/18 GF |

*Primary Examiner*—Thomas A. Robinson
*Attorney, Agent, or Firm*—Craig & Antonelli

[57] ABSTRACT

A speech path system for a telephone exchange having crosspoint switches of a speech path network comprising semiconductor switching devices of four or more layers, including a memory circuit for storing the operating conditions of said switching devices, a drive circuit of a high A.C. impedance for actuating said switching devices in response to output signals from said memory circuit, a subscriber D.C. loop detection circuit of a high impedance provided at a subscriber terminal of said speech path network, and a speech current supply circuit with speech current switching means and a supply current detection circuit provided at a trunk terminal of said speech path network.

8 Claims, 4 Drawing Figures

SPEECH PATH SYSTEM

The present invention relates to a speech path system for a telephone exchange, and more particularly to a speech path system for a space division type exchange having a speech path network having crosspoint switches, with each switch consisting of a semiconductor device of four or more layers, such as a thyristor.

In the past, as speech path switches for the telephone exchange, mechanical contacts such as cross-bar switches or reed relay switches have been used. On the other hand with the recent remarkable progress in semiconductor manufacturing technology particularly in integrated circuit technology, it has been attempted to introduce semiconductor switches such as thyristor, PNPN diodes, or field effect transistors in the speech path switches.

However, with the present day integrated circuit technology, it is difficult to economically manufacture devices capable of withstanding a ringing signal of a substantially high voltage such as 75 volts r.m.s. for ringing a bell of a telephone set. Consequently, an isolation transformer is provided between a subscriber line and the speech path network so as to pass the ringing signal or speech current directly to the subscriber line without passing through the speech path switch. That is, since the speech path network can only pass a low level speech signal, a transformer and a ringing signal circuit are required for each subscriber.

Because the subscriber line is not D.C. coupled to the trunk through the speech path network, in a subscriber exchange in which various services to the subscribers are required, the subsriber circuit becomes complex and voluminous, and also expensive. Therefore, this system is not economically acceptable except in special cases, and hence it has exclusively been used only in small capacity private branch-exchanges.

It is an object of the present invention to overcome the above defects of the prior art and to provide an economic speech path system in which a subscriber line is D.C. coupled to a trunk using semiconductor speech path switches.

It is another object of the present invention to allow to pass a low frequency ringing signal and a charge pulse each having a relatively large amplitude through a semiconductor speech path system.

It is another object of the present invention to enhance the speed of the speech path switches as well as the speed of switching of the speech path by the use of electronic circuitry in a subscriber circuit and a trunk circuit.

It is a further object of the present invention to eliminate a speech current detection circuit in a trunk circuit to make further economies in the system.

A principal feature of the present invention is to provide an economical speech path system by systematically coupling a speech path network consisting of semiconductor devices each having four or more layers, such as thyristors, as crosspoint switches of a speech path switch, with a subscriber circuit having a transformation circuit of a high A.C. impedance which detects a call by a subscriber and a trunk circuit having a speech current supply circuit with speech current switching means.

Another feature of the present invention resides in that, in the above principal feature, a pair of semiconductor switching devices are connected in anti-parallel at each of the crosspoints.

According to a preferred embodiment of the present invention, there is provided a speech path system which includes a speech path network having an anti-parallel pair of semiconductor switching devices of four or more layers arranged at crosspoints of the network, a memory circuit for storing the operating conditions of said switching devices, a driver circuit of a high A.C. impedance for actuating said switching devices in response to output signals from said memory circuit, a subscriber D.C. loop detection circuit of a high resistance provides at a subscriber terminal of said speech path network, and a speech current supply circuit with a speech current blocking function and a speech current detection circuit each provided at a trunk terminal of said speech path network, whereby said D.C. loop detection circuit detects a call by a subscriber to set said memory circuit for closing the speech path and said speech current detection circuit detects the termination of speech by the subscriber to release the memory circuit and cause said speech current supply circuit to block the speech current for opening the previously set speech path.

The above and other objects, features and advantages of the present invention will become more apparent from the following detailed description of the preferred embodiments of the invention when taken in conjunction with the accompanying drawings, in which.

Figure 1:
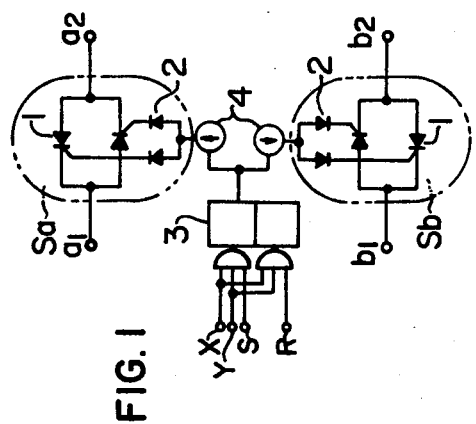
FIG. 1 is a circuit diagram showing one of the crosspoints of a speech path network in one embodiment of the present invention.

Referring to FIG. 1, a circuit of a crosspoint of a 2-wire semiconductor speech path switch used in one embodiment of the present invention is shown. In FIG. 1, S$a$ and S$b$ are crosspoint switches of 2-wires $a_1$-$a_2$ and $b_1$-$b_2$ respectively. In each of the crosspoint switches, 1 is a crosspoint thyristor having a sufficiently high breakdown voltage to withstand a ringing signal, and a pair of such devices are connected in anti-parallel to allow the conduction of a bipolar ringing signal. 2 is an anti-reverse diode for the gate of the crosspoint thyristor 1, 3 is a crosspoint memory circuit, such as a flip-flop, for storing an operating condition of the crosspoint thyristor 1 and it is set or reset in response to an AND function of address signals X and Y and set or reset signal S or R. 4 is a crosspoint drive circuit for driving the crosspoint thyristor 1 under the control of the crosspoint memory circuit 3 and it exhibits a high impedance when viewed from the anti-reverse diode 2. By the provision of the crosspoint memory circuit 3, the crosspoint switch can be maintained at its on or off state stably and continuously, independently of current flowing condition through the crosspoint thyristor 1.

By arranging the crosspoints shown in FIG. 1 in and $m \times n$ matrix, an $m \times n$ speech path switching matrix is constructed. Furthermore this speech path switch can be extended to construct a one-stage speech path network or a multi-stage speech path network, as required, in a similar manner used in the conventional cross-bar switches.

Figure 2:
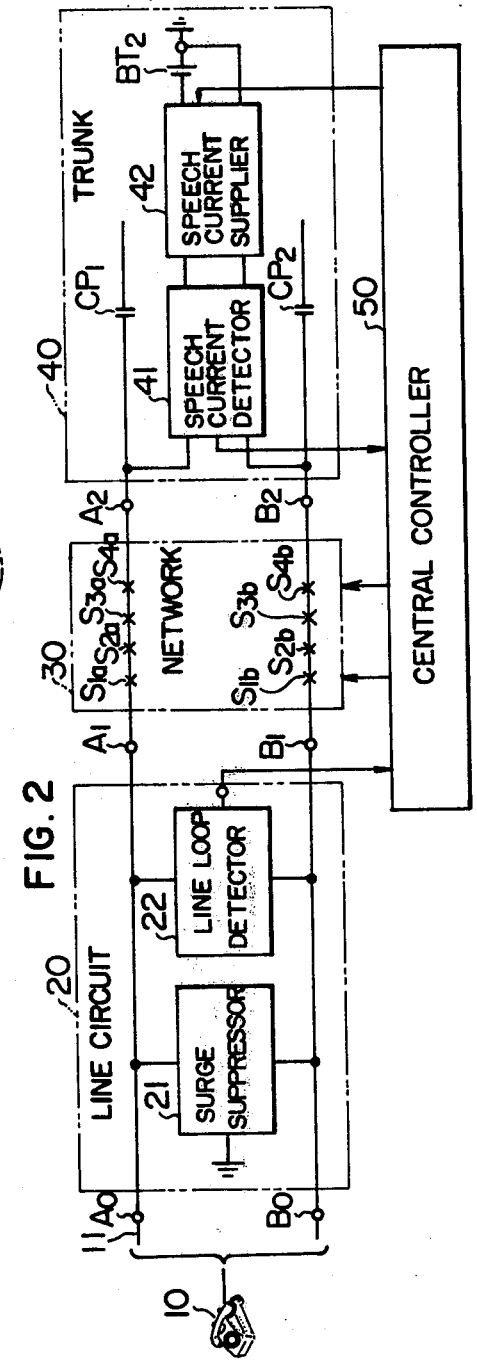
FIG. 2 is a block diagram showing an embodiment of the present invention.
Figure 3:
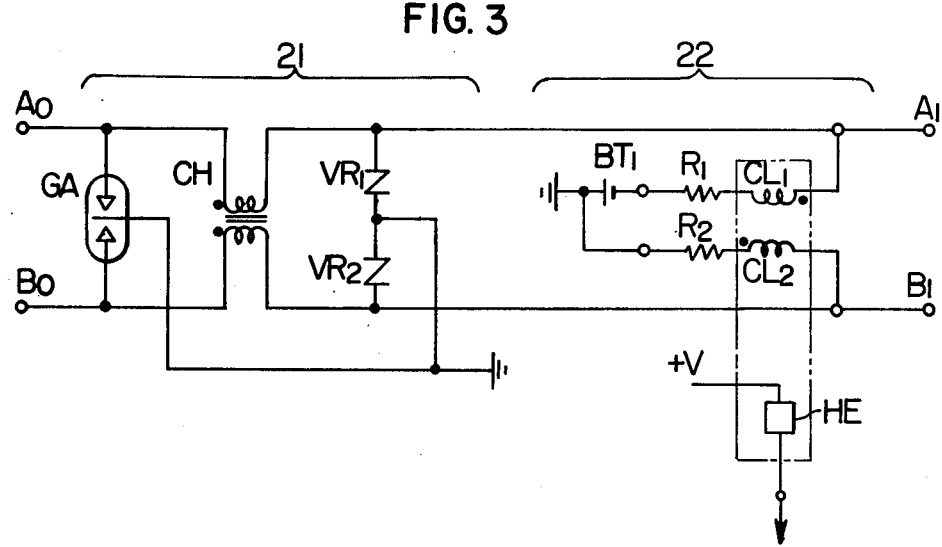
FIG. 3 is a circuit diagram of a line circuit in FIG. 2.

FIG. 2 shows one speech path of a speech path system of one embodiment of the present invention which uses a speech path network comprising the above speech path switching matrix. In FIG. 2, 30 is a four-stage speech path network, and $S_{1a}$ and $S_{1b}$, $S_{2a}$ and $S_{2b}$, $S_{3a}$ and $S_{3b}$, and $S_{4a}$ and $S_{4b}$ show pairs of crosspoint switches in first, second, third and fourth stages, respectively, which are of similar construction to the crosspoint switch shown in FIG. 1. 10 is a subscriber telephone set which is connected to a subscriber circuit 20 through a line 11. The subscriber circuit 20 comprises an external surge suppressor 21 connected to the line and a subscriber D.C. loop detection circuit 22 directly coupled to subscriber terminals $A_1$ and $B_1$ of a speech path network 30 for detecting a call by a subscriber. The subscriber D.C. loop detection circuit 22 is constructed to exhibit a high resistance or high impedance when viewed from the terminals $A_1$ and $B_1$. Details of the subscriber circuit 20 are shown in FIG. 3. A left half of FIG. 3 shows the external surge suppressor circuit 21 and a right half shows the subscriber D.C. loop detection circuit 22. The external surge suppressor circuit 21 comprises a gap arrestor GA connected across line terminals AO and BO, a common-mode-choke-coil CH connected thereto, and a series connection of two varistors VR1 and VR2. With this arrangement, when an external surge is applied to the line terminals AO and BO in phase, such as by a lightning stroke, the common-mode-choke-coil CH exhibits a high impedance to the external surge so that a small current flows through the series connection of the varistors VR1 and VR2 to the ground. The series connection of the varistors VR1 and VR2 clamps a potential difference thereacross to 180 ~ 200 volts for several microseconds, during which the gap arrestor discharges to limit the voltage across the line terminals AO and BO to its discharge voltage of 70 ~ 100 volts. A current capacity of the gap arrestor is large enough to withstand the external surge.

The subscriber D.C. loop detection circuit 22 comprises two coils CL1 and CL2 having their one ends connected to terminals A1 and B1, respectively, current limiting resistors R1 and R2 connected to the other ends of the coils, and a Hall effect element HE for converting flux changes by the coils CL1 and CL2 to a logical output signal. Resistors R1 and R2 are connected to opposite electrodes of a battery BT1. The operation of the subscriber D.C. loop detection circuit 22 is as follows: When the handset of the subscriber telephone set 10 is off the hook, a loop current flows through a circuit of ground-resistor R2 coil CL2 - line - subscriber telephone set 10 - line - coil CL1 - resistor R1 - battery BT1 - ground. This loop current is converted to a magnetic flux by the coils CL1 and CL2, which magnetic flux is then converted to an electrical signal by the Hall effect element HE. The resistors R1 and R2 have high resistances to reduce the attenuation of the speech current.

An output signal from the subscriber circuit 20 is sent to a central controller 50 via any presently available scan circuit. The central controller 50 is advantageously a presently available stored-program controlled data processing system, the details of the construction thereof not being discussed herein because they are not necessary for the understanding of the present invention.

Figure 4:
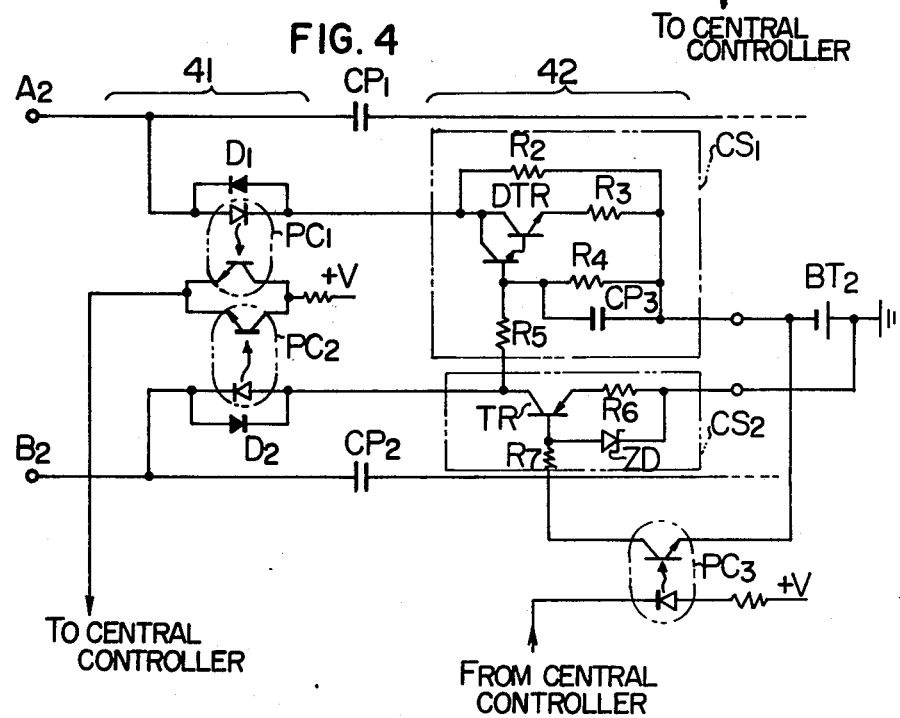
FIG. 4 is a circuit diagram showing a main section of a trunk circuit in FIG. 2.

Connected to trunk terminals A2 and B2 of the network 30 of FIG. 2 is a trunk circuit 40 which comprises a speech current detection circuit 41 and a speech current supply circuit 42. The speech current supply circuit 42 supplies a speech current or stops the supply thereof in response to a command from the central controller 50. The speech current supply circuit 42 exhibits a high A.C. impedance when viewed from the terminals A2 and B2. The result of the detection by the speech current detection circuit 41 is indicated to the central controller 50 via a scan unit which is not shown. The details of the speech current supply circuit 42 and the speech current detection circuit 41 are shown in FIG. 4.

The speech current detection circuit 41 comprises two photo-couplers PC1 and PC2 connected to the terminals A2 and B2, respectively, and protection diodes D1 and D2. As is well known, the photo-couplers PC1 and PC2 each comprises a photo-coupled combination of a light emitting diode and a photo-transistor. Collector electrodes of the photo-transistors of the photo-couplers PC1 and PC2 are connected to a power supply terminal +V and emitter electrode are connected to the central controller 50.

The speech current supply circuit 42 comprises first and second constant current circuits CS1 and CS2 connected to the light emitting diodes of the photo-couplers PC1 and PC2, respectively, of the speech current detection circuit 41, and a photo-coupler PC3 which controls the second constant current circuit CS2.

The second constant current CS2 comprises a transistor TR, resistors R6 and R7 connected to emitter and base, respectively, of the transistor TR, and a zener diode ZD connected between the base electrode and an emitter resistor R6, and the turn-on and turn-off of the circuit CS2 is controlled by the photo-coupler PC3. Namely, when a loop comprising the network 30, line circuit 20, line 11 and subscriber telephone set is formed between the terminals A2 and B2, and the light emitting diode of the photo-coupler PC3 is actuated in response to a command from the central controller 50, the photo-transistor is turned on and a current flows through the transistor TR via the above loop and the light emitting diodes of the photo-couplers PC1 and PC2, the first constant current circuit CS1 and the power suppy BT2. At the same time, a zener current flows through the zener diode ZD to maintain the voltage across the base electrode of the transistor TR and the emitter resistor R6 at a fixed zener voltage so that a current flowing from the emitter electrode of the transistor TR to the collector electrode thereof is maintained at a constant magnitude.

On the other hand, the first constant current circuit CS1 is constructed as a sink type constant current circuit comprising a Darlington transistor DTR and resistor R2, R3, R4 and R5 and a capacitor CP3, and it operates dependently of the second constant current circuit CS2.

Referring to FIG. 2, exchange operation is now explained. When the handset of the subscriber telephone set 10 is off the hook, the subscriber D.C. loop detection circuit 22 of the line circuit 20 detects a subscriber D.C. loop and indicates the result of the detection through a scan unit to the central controller 50 so that the central controller 50 can be informed of the call by the subscriber. After receiving the dialing of the calling subscriber, the central processor 50 sets corresponding crosspoint switches $S_{1a}$, $S_{1b}$ ~ $S_{4a}$, $S_{4b}$ of the network 30 to establish paths between the terminals A1 — A2 and B1 — B2. At the same time, it activates the speech current supply circuit 42 of the trunck 40 to supply a speech current to the subscriber telephone set 10 through the loop of ground-speech current supply circuit 42 — speech current detection circuit 41 — terminal B2 — crosspoint switches $S_{4b}$ — $S_{1b}$ — terminal B1 — subscriber telephone set 10 — terminal A1 — crosspoint switches $S_{1a}$ — $S_{4a}$ — terminal A2 — speech current detection circuit 41 — speech current supply circuit 42 — battery BT2. Under this condition, the subscriber telephone set 10 can communicate with a destination subscriber telephone set. Since the crosspoint drive circuit 4 of FIG. 1, the subscriber D.C. loop detection circuit 21 of FIG. 2 or 3 and the speech current supply circuit 42 of FIG. 2 or 4 exhibit high A.C. impedance, a parallel insertion loss of sound signal can be neglected. However, a speech loss due to the forward resistances of the crosspoint switches $S_{1a}$, $S_{1b}$ — $S_{4a}$ and $S_{4b}$ (approximately 5 ~ 10 Ω) may be compensated by providing a bidirectional amplifier in the trunk circuit 40, as required.

When the speech is terminated and the handset of the subscriber telephone set 10 is on the cradle, the speech current detection circuit 41 is reset so that the central controller 50 can detect the termination of speech of the subscriber. In this case, since the subscriber D.C. loop detection circuit 22 is of sufficiently high resistance (e.g. 10 k Ω or more), the operation of the speech current detection circuit 41 is not affected.

When the termination of speech is detected, the central processor 50 issues a command to the network 30 to reset the crosspoint memory circuits 3 for the crosspoint switches $S_{1a}$, $S_{1b}$ — $S_{4a}$ and $S_{4b}$, and then issues a command to the trunk 40 to cease the operation of the speech current supply circuit 42 and open the paths between the terminals A1 — A2 and B1 — B2 to restore the initial state.

In the above embodiment, monitoring of speech by the subscriber is effected by the speech current detection circuit 41 of the trunk 40. Alternatively, it may be effected by the subscriber D.C. loop detection circuit 22 of the line circuit 20 without providing the speech current detection circuit 41. Namely, since the subscriber D.C. loop detection circuit 22 is continuously inserted during the speech while exhibiting a high impedance, and the battery BT2 is inserted in the D.C. loop looking from the terminals A1 and B1 into the trunk 40, the operating state of the speech current supply circuit 42 can be rendered independent in detecting the D.C. loop by the subscriber D.C. loop detection circuit 22 if the detection battery BT1 of the subscriber D.C. loop detection circuit 22 uses a similar battery. Thus, the subscriber D.C. loop detection circuit 22 can be rendered to respond only to the subscriber D.C. loop (200 Ω ~ 1.7 k Ω), and the central controller 50 can detect the call or the termination of speech by merely monitoring the subscriber D.C. loop detection circuit 22 and hence no speech current detection circuit 41 is needed in the trunk 40.

In the crosspoint drive circuit 4 of FIG. 1, when an optical drive by a photo-coupler is used instead of the constant current circuit of high A.C. impedance, the anti-reverse diode 2 is not necessary and a more preferable condition is brought about because the crosspoint thyristor 1 and the drive are perfectly electrically isolated.

As described hereinabove, since the present invention uses a bidirectional thyristor as the crosspoint element, forward resistance and offset voltage thereof are relatively small and can withstand a high voltage. Furthermore, since the crosspoint memory circuits are provided, ringing signals or charge pulses of a large amplitude may be passed without disturbing the stability of the switching state so that a semiconductor speech path system having a similar function as that of a conventional mechanical contact can be provided.

The speech path switching matrix is small in size and when the call or the termination of speech is detected by the subscriber D.C. loop detection circuit, the detection of the speech current by the trunk is no longer necessary, which considerably contributes to compactness and economization.

In addition, by constructing the speech current supply circuit by an electronic circuit, switching speed is increased and hence making and breaking of a path can be effected at a high speed. Moreover, since the current limiting function may be readily added, the crosspoint switches can be protected from overcurrent due to a grounding accident of the subscriber line.

According to the present invention, the present full electronic exchange of small size, light weight, high operation speed and high reliability can be widely used as a private branch enchange as well as a subscriber line exchange.

What is claimed is:

1. A speech path system comprising:
a speech path network including a pair of line terminals and a pair of trunk terminals and having switching elements comprising semiconductors having at least four layers arranged at crosspoints for making or breaking the connections between said line terminal pair and said trunk terminal pair, and switch control means, each switch control means comprising a drive circuit for driving the individual semiconductor switching element and a memory circuit for storing the operating state of said drive circuit;
a subscriber line circuit for connecting said line terminal pair directly to a subscriber line; and
a trunk circuit connected to said trunk terminal pair and having a speech current supply circuit D.C. coupled to the trunk terminal pair and including means for turning on or off the speech current.

2. A speech path system according to claim 1, wherein said subscriber line circuit is provided with a subscriber D.C. loop detection circuit of high impedance connected across said line terminal pair.

3. A speech path system according to claim 1, wherein said trunk circuit is further provided with a speech current detection circuit connected to said trunk terminal pair of the speech path network.

4. A speech path system according to claim 2, wherein said subscriber D.C. loop detection circuit comprises two coils having their one ends connected to said pair of wires of said subscriber line circuit, respectively, two resistors connected to said coils, respectively, and a Hall effect element for detecting a magnetic flux created by said coils.

5. A speech path system according to claim 3, wherein said speech current detection circuit of said trunk circuit comprises light emitting diodes connected to said pair of wires of said trunk circuit, respectively, and photo-transistors photo-coupled to said light emitting diodes.

6. A speech path system according to claim 1, wherein said speech current supply circuit of said trunk circuit includes control means to turn on or off the supply of the speech current, said control means including a photo-coupler.

7. A speech path system according to claim 1, wherein said speech current supply circuit of said trunk circuit comprises a first constant current circuit and a sink type constant current circuit which operates dependently on said first constant current circuit.

8. A speech path system according to claim 1, wherein each of said semiconductor switching elements at the crosspoints comprises an anti-parallel-connected pair of four-layer semiconductor switching elements.

* * * * *